United States Patent
Yuma et al.

(10) Patent No.: US 10,625,604 B2
(45) Date of Patent: Apr. 21, 2020

(54) VEHICLE SHIFT CONTROL DEVICE

(71) Applicant: TOYOTA JIDOSHA KABUSHIKI KAISHA, Toyota-shi, Aichi (JP)

(72) Inventors: Takashi Yuma, Toyokawa (JP); Koki Ueno, Toyota (JP); Masato Tateno, Toyota (JP); Yusuke Nakade, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 15/869,813

(22) Filed: Jan. 12, 2018

(65) Prior Publication Data
US 2018/0201126 A1 Jul. 19, 2018

(30) Foreign Application Priority Data

Jan. 17, 2017 (JP) .................................. 2017-006265

(51) Int. Cl.
| | |
|---|---|
| *F16H 59/02* | (2006.01) |
| *B60K 17/04* | (2006.01) |
| *G01D 5/244* | (2006.01) |
| *G01D 5/20* | (2006.01) |
| *F16H 59/10* | (2006.01) |
| *F16H 61/12* | (2010.01) |

(Continued)

(52) U.S. Cl.
CPC ......... *B60K 17/04* (2013.01); *F16H 59/0204* (2013.01); *F16H 59/105* (2013.01); *F16H 61/12* (2013.01); *G01D 5/2033* (2013.01); *G01D 5/24461* (2013.01); *F16H 59/44* (2013.01); *F16H 2061/1232* (2013.01); *G01D 3/08* (2013.01); *G01D 5/145* (2013.01)

(58) Field of Classification Search
None
See application file for complete search history.

(56) References Cited

U.S. PATENT DOCUMENTS

| | | | |
|---|---|---|---|
| 5,908,460 | A | 6/1999 | Amisano et al. |
| 5,964,121 | A | 10/1999 | Steeby et al. |

(Continued)

FOREIGN PATENT DOCUMENTS

| | | |
|---|---|---|
| CN | 1195083 A | 10/1998 |
| FR | 2834034 A1 | 6/2003 |

(Continued)

*Primary Examiner* — Justin Holmes
(74) *Attorney, Agent, or Firm* — Oliff PLC (57) ABSTRACT

A vehicle shift control device comprises: a shift position deciding portion deciding a shift position of a shift operating device based on a sensor signal output according to an operation of the shift operating device; and a drive power output command portion selecting a shift range based on a shift position determination signal output from the shift position deciding portion to cause a vehicle to run, when a communication abnormality has occurred so that the shift position determination signal is not transmitted from the shift position deciding portion to the drive power output command portion, the vehicle shift control device selecting a shift range maintained at the time of occurrence of the communication abnormality of the shift position determination signal if a vehicle speed is equal to or greater than a predetermined value, and selecting a neutral range if the vehicle speed is less than the predetermined value.

8 Claims, 10 Drawing Sheets

(51) Int. Cl.
   *G01D 3/08* (2006.01)
   *G01D 5/14* (2006.01)
   *F16H 59/44* (2006.01)

(56) References Cited

U.S. PATENT DOCUMENTS

| | | | |
|---|---|---|---|
| 7,139,652 B2 * | 11/2006 | Kikuchi | B60K 37/06 |
| | | | 701/51 |
| 2001/0039232 A1 | 11/2001 | Ehrmaier et al. | |
| 2004/0162661 A1 | 8/2004 | Kikuchi | |
| 2014/0188356 A1 * | 7/2014 | Hokoi | F16H 59/08 |
| | | | 701/58 |
| 2017/0219089 A1 | 8/2017 | Tsutsumi et al. | |

FOREIGN PATENT DOCUMENTS

| | | |
|---|---|---|
| JP | 2001-289084 A | 10/2001 |
| JP | 2010-151302 A | 7/2010 |
| JP | 2013-104463 A | 5/2013 |
| JP | 2016-038002 A | 3/2016 |
| JP | 2016-158451 A | 9/2016 |
| WO | 2016/020739 A1 | 2/2016 |

\* cited by examiner

| SHIFT POSITION | N POSITION | R POSITION | D POSITION | M POSITION | B POSITION |
|---|---|---|---|---|---|
| SHIFT-SENSOR DETECTION SIGNAL VOLTAGE $V_{SF}$ | mid | high | low | mid | low |
| SELECT-SENSOR DETECTION SIGNAL VOLTAGE $V_{SL}$ | high | high | high | low | low |

VEHICLE SHIFT CONTROL DEVICE

BACKGROUND OF THE INVENTION

This application claims priority from Japanese Patent Application No. 2017-006265 filed on Jan. 17, 2017, the disclosure of which is herein incorporated by reference in its entirety.

FIELD OF THE INVENTION

The present invention relates to a control technique when a communication abnormality has occurred in a vehicle so that a shift position signal indicative of a shift operation position of a shift operator is not transmitted from a shift position deciding portion to a drive power output command portion.

DESCRIPTION OF THE RELATED ART

A device has been proposed that decides a shift operation position of a shift operating device based on signals (output voltages) respectively output from four sensors arranged for detecting the shift operation position. The position sensor of Japanese Laid-Open Patent Publication No. 2016-038002 is an example thereof. In Japanese Laid-Open Patent Publication No. 2016-038002, control is provided such that even when an abnormality has occurred in one of the four sensors, the shift operation position of the shift operating device is decided based on the remaining three sensors so as to enable evacuation running, and control is provided in which a power transmission device is switched to a neutral position to prevent an erroneous operation of running when any two of these three sensors output a signal corresponding to a shift operation position for running in a direction opposite to a current running direction.

In Japanese Laid-Open Patent Publication No. 2016-038002, when any two of three sensors output a signal corresponding to a shift operation position for running in the direction opposite to the current shift range during running of a vehicle using three normal sensors, a power transmission device is put into a neutral state to reliably prevent reverse running due to erroneous operation of forward/reverse switching for fail-safe. However, in a vehicle shift control device comprising a shift position deciding portion deciding a shift position and a drive power output command portion causing the vehicle to run based on a shift position determination signal output from the shift position deciding portion, if the power transmission device is always switched to a neutral position when a communication abnormality has occurred in which the shift position determination signal from the shift position deciding portion is not transmitted to the drive power output command portion of the vehicle, the vehicle becomes unable to run by itself and cannot ensure evacuation running to a stopping place distant from a place where the abnormality has occurred.

SUMMARY OF THE INVENTION

The present invention was conceived in view of the situations above and it is therefore an object of the present invention to provide a vehicle shift control device comprising a shift position deciding portion deciding a shift position and a drive power output command portion causing a vehicle to run based on a shift position determination signal output from the shift position deciding portion, the vehicle shift control device enabling the vehicle to ensure evacuation running to a stopping place distant from a place where a communication abnormality has occurred even if the abnormality has occurred so that the shift position determination signal is not transmitted from the shift position deciding portion to the drive power output command portion.

The object indicated above is achieved according to the following modes of the present invention:

According to a first mode of the invention, there is a vehicle shift control device comprising: a shift position deciding portion deciding a shift position of a shift operating device based on a sensor signal output according to an operation of the shift operating device; and a drive power output command portion selecting a shift range based on a shift position determination signal output from the shift position deciding portion to cause a vehicle to run, wherein when a communication abnormality has occurred so that the shift position determination signal is not transmitted from the shift position deciding portion to the drive power output command portion, the vehicle shift control device selects a shift range maintained at the time of occurrence of the communication abnormality of the shift position determination signal if a vehicle speed is equal to or greater than a predetermined value, and selects a neutral range if the vehicle speed is less than the predetermined value.

According to a second mode of the invention, the vehicle shift control device according to the first mode of the invention is configured such that when the vehicle speed is equal to or greater than the predetermined value and the shift range maintained at the time of occurrence of the communication abnormality of the shift position determination signal is a running range for moving the vehicle forward or backward, a drive power limitation is imposed to make an acceleration of the vehicle equal to or less than a predetermined value.

According to a third mode of the invention, the vehicle shift control device according to the first or second mode of the invention is configured such that the vehicle further includes a parking lock device locking drive wheels of the vehicle and a parking switch outputting an operation signal for actuating the parking lock device, and if the vehicle speed is equal to or less than a predetermined vehicle stopping speed threshold value, the parking lock device is actuated based on the operation signal.

According to a fourth mode of the invention, the vehicle shift control device according to any one of the first through third modes of the invention is configured such that if the shift range maintained at the time of occurrence of the communication abnormality of the shift position determination signal is a parking range, the parking range is retained.

According to the first mode of the invention, in the vehicle shift control device including the shift position deciding portion deciding the shift position based on the sensor signal output according to the operation of the shift operator and the drive power output command portion selecting the shift range based on the shift position determination signal output from the shift position detecting portion for causing the vehicle to run, if a communication abnormality has occurred so that the shift position determination signal is not transmitted from the shift position deciding portion to the drive power output command portion, the shift range maintained at the time of occurrence of the communication abnormality of the shift position determination signal is selected when the vehicle speed is equal to or greater than the predetermined value, and the neutral range is selected when the vehicle speed is less than the predetermined value. Thus, the evacuation running is enabled during the vehicle speed is maintained to be equal to or larger than a predetermined vehicle speed threshold value that is a relative low.

According to the second mode of the invention, if the vehicle speed is equal to or greater than the predetermined value and the shift range maintained at the time of occurrence of the communication abnormality of the shift position determination signal is a running range causing the vehicle to move forward or backward, a drive power limitation is imposed such that the acceleration of the vehicle is made equal to or less than the predetermined value so as to enable suppression to the acceleration at which the operability of the vehicle can easily be ensured.

According to the third mode of the invention, the vehicle further includes the parking lock device locking the drive wheels and the parking switch outputting the operation signal for actuating the parking lock device and, if the vehicle speed is equal to or less than the predetermined vehicle stopping speed threshold value, the parking lock device is actuated based on the operation signal, so that the driver can select the parking lock.

According to the fourth mode of the invention, if the shift range maintained at the time of occurrence of the communication abnormality on the shift position determination signal is the parking range, the parking range is retained to suppress switching between the shift ranges when the switching is unnecessary.

DESCRIPTION OF THE PREFERRED EMBODIMENTS

An embodiment of the present invention is described below in detail with reference to the drawings.

First Example

Figure 1:
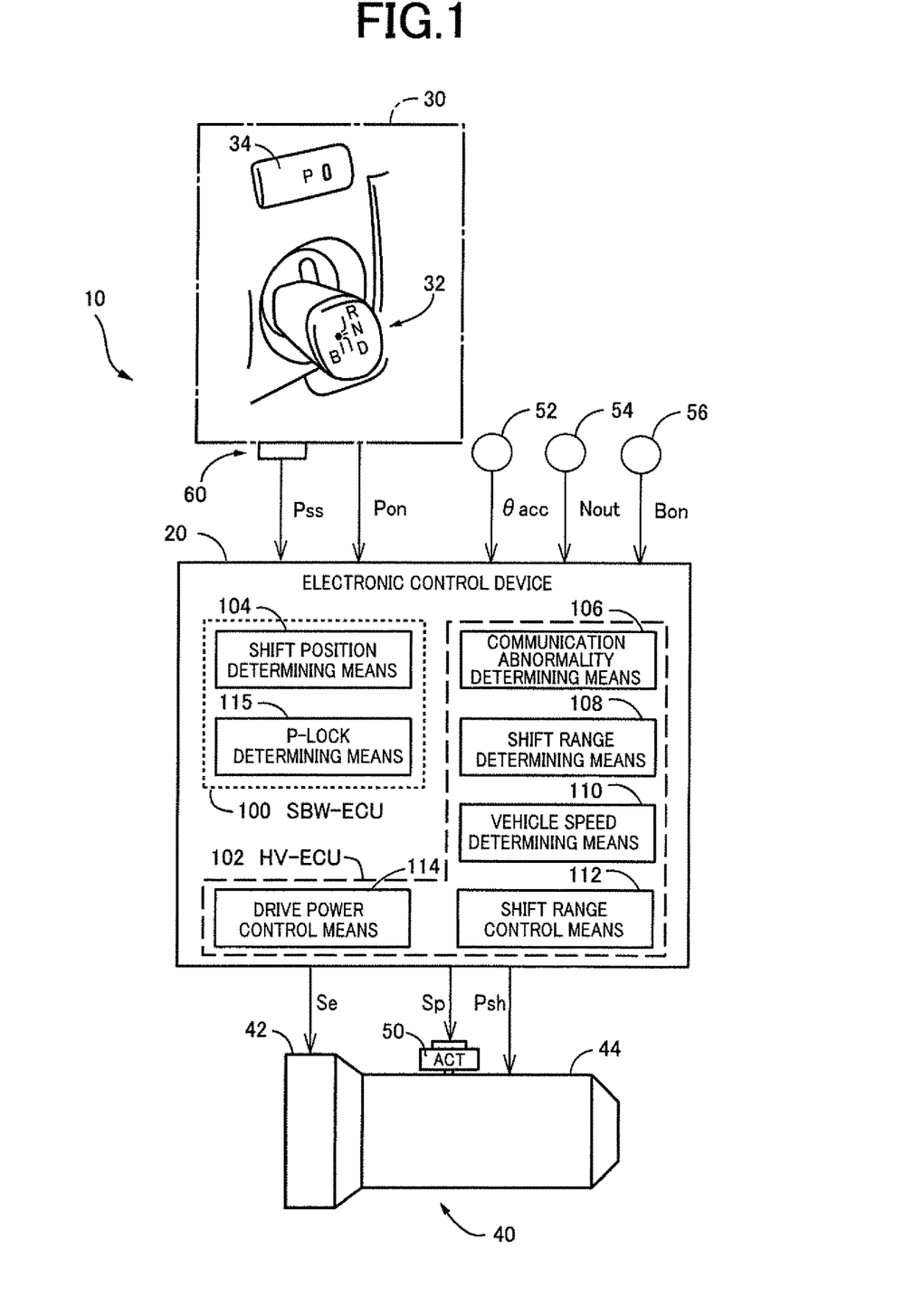
FIG. 1 is a diagram for explaining a general configuration of a vehicle shift control device that is an example of the present invention.

FIG. 1 is a diagram for explaining a general configuration of a vehicle shift control device 10 that is an example of the present invention. The shift control device 10 includes an electronic control device 20, a shift operation device 30, etc., and functions as a shift control device of a shift-by-wire system electrically switching a shift range of a power transmission device 44 constituting a drive device 40. The drive device 40 further includes a drive power source 42. In the examples of the following description, the shift control device 10 of the present invention is applied to a hybrid vehicle including an engine and an electric motor as the drive power source 42; however, the shift control device 10 of the present invention is applicable to other types of vehicles such as engine-driving vehicles and electric vehicles. The electronic control device 20 corresponds to a control device of the present invention.

The electronic control device 20 includes a plurality of so-called microcomputers made up of a CPU, a ROM, a RAM, an input/output interface, etc., and executes signal processes according to a program stored in advance in the ROM while utilizing a temporary storage function of the RAM so as to provide a drive control such as a hybrid drive control related to an engine and a motor MG not shown constituting the drive power source 42 included in the drive device 40, a switching control of the shift range of the power transmission device 44 using a shift-by-wire system, etc.

The electronic control device 20 is supplied with, for example, a shift operation position signal Pss from a position sensor (hereinafter, Hall ICs are referred to as the position sensor) for detecting a position (shift operation position) of a shift lever 32 (corresponding to a shift operator of the present invention; hereinafter, the shift operator is referred to as the shift lever); a plurality of signals including a P-switch signal Pon from a parking switch (P switch) 34 for actuating a parking lock device 50 operated by a driver to lock drive wheels (not shown) of the vehicle; an accelerator opening degree θacc (%) detected by an accelerator opening degree sensor 52, for example; an output shaft rotation speed Nout (rpm) corresponding to a vehicle speed V (km/h) detected by an output shaft rotation sensor 54; a brake operation signal Bon detected by a brake switch 56, etc.

The electronic control device 20 outputs, for example, a drive force command signal Se for commanding an operation of the engine and the electric motor, i.e., the drive power source 42, in the drive device 40; a shift range command signal Psh for switching the shift range of the power transmission device 44; and a P-switching command signal Sp for commanding an actuation of the parking lock device 50 locking the drive wheels not shown of the vehicle, etc.

Figure 2:
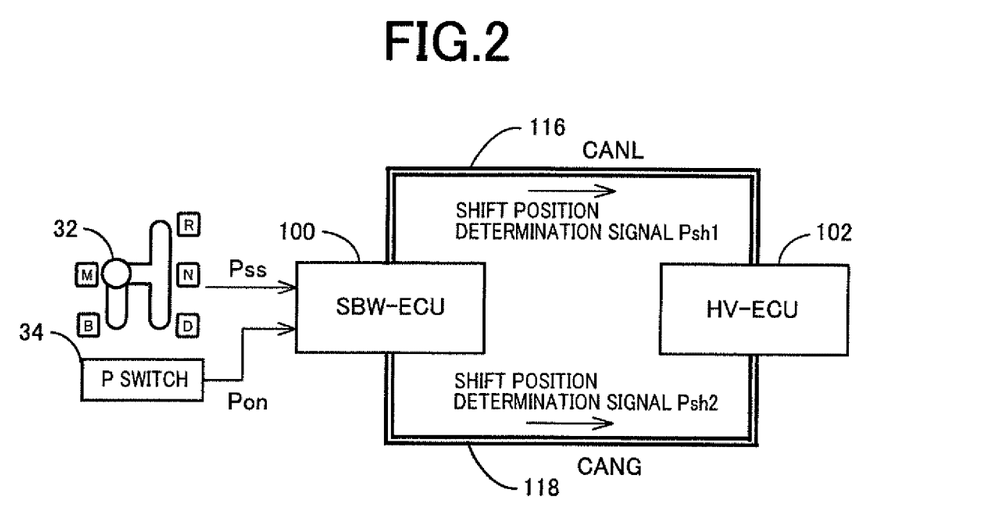
FIG. 2 is a block diagram for explaining a shift position deciding portion (SBW-ECU) and a drive power output command portion (HV-ECU) of FIG. 1 as well as a communication line transmitting a signal output from the shift position deciding portion to the drive power output command portion.

FIG. 2 is a block diagram of a control unit constituting a control system in the electronic control device 20. An SBW-ECU 100 corresponding to the shift position deciding portion determines a shift position based on the shift position signal Pss of the shift lever 32 operated by the driver, and outputs shift position determination signals Psh1, Psh2 and the P-switch signal Pon through a local CAN (Controller Area Network) communication portion (hereinafter referred to as CANL) 116 and a global CAN communication portion (hereinafter referred to as CANG) 118 to an HV-ECU 102 corresponding to the drive power output command portion. The SBW-ECU 100 outputs the P-switching command signal Sp for giving instructions for a P-lock and a release of the P-lock to the parking lock device 50 based on the P-switch signal Pon of the P switch 34 operated by the driver and the running state of the vehicle. Additionally, the SBW-ECU 100 determines an abnormality of Hall ICs 64, 66, 68, 70 (hereinafter referred to as Hall ICs if not particularly distinguished). When the signals Psh1, Psh2 are normally transmitted from the CANL 116 and the CANG 118, the HV-ECU 102 performs a control operation based on the shift position determination signal Psh1 transmitted via the CANL 116, for example. If information through the CANL 116 is not received, a control operation is performed based on the shift position determination signal Psh2 received via the CANG 118. A communication abnormality may occur as a state in which the signals through both the CANL 116 and the CANG 118 are not received, and this may be caused due to a state in which both the CANL 116 and the CANG 118 cannot transmit information, for example, caused by disconnection of communication lines of the CANL 116 and the CANG 118, or due to a state in which the SBW-ECU 100 cannot output a signal caused by such as a failure, for example. Although the CAN communication portions are constituted by two signal portions, i.e., the CANL 116 and the CANG 118, the CAN communication portions are not particularly limited to two signal portions and can be one signal portion or three or more communication portions.

Figure 3:
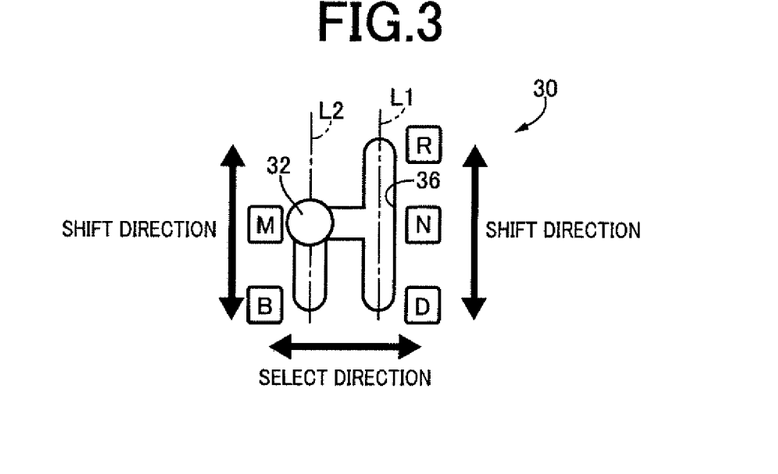
FIG. 3 shows an overview of a shift operation device operated with a shift lever of FIG. 1.

FIG. 3 shows an example of an overview of the shift operation device 30 operated with the shift lever 32 of FIG. 1. In FIG. 3, the P switch 34 is not shown. The shift operation device 30 includes the shift lever 32 of a momentary type disposed in the vicinity of a driver's seat, for example, and operated to multiple shift operation positions. The momentary type is a type in which the shift lever 32 automatically returns to a preset home position (M position) when the shift lever 32 is released from operation by the driver. Therefore, the shift position is an intended shift state of a vehicle determined based on the operation of the shift lever 32, the P switch 34, etc. by the driver, and does not necessarily coincide with the position of the shift lever 32.

As shown in FIG. 3, the shift lever 32 is allowed to move along a shift gate 36 in a shift direction parallel to a vehicle longitudinal direction and a select direction parallel to a vehicle width direction. In the shift operation device 30, the shift lever 32 is allowed to be operated in the shift direction along a first straight line L1 and an operation along a second straight line L2 parallel to the first straight line L1. Three shift operation positions are set on the first straight line L1 as an R operation position for switching to a reverse running range of the power transmission device 44, a neutral position (N operation position) at which power transmission is interrupted, and a D operation position for switching to a forward running range of the power transmission device 44. Two operation positions are set on the second straight line L2 as a home position (M operation position) to which the shift lever 32 is automatically returned after operation and a B operation position at which an engine brake force is generated. A select operation of the shift lever 32 is allowed between the M and N operation positions. In this description, a neutral range, a drive range, a reverse range, and an engine brake range are used as control modes respectively selected based on the determination of the N position, the D position, the R position, and the B position, and substantially correspond to the N operation position, the D operation position, the R operation position, and the B operation position, respectively.

Figure 4:
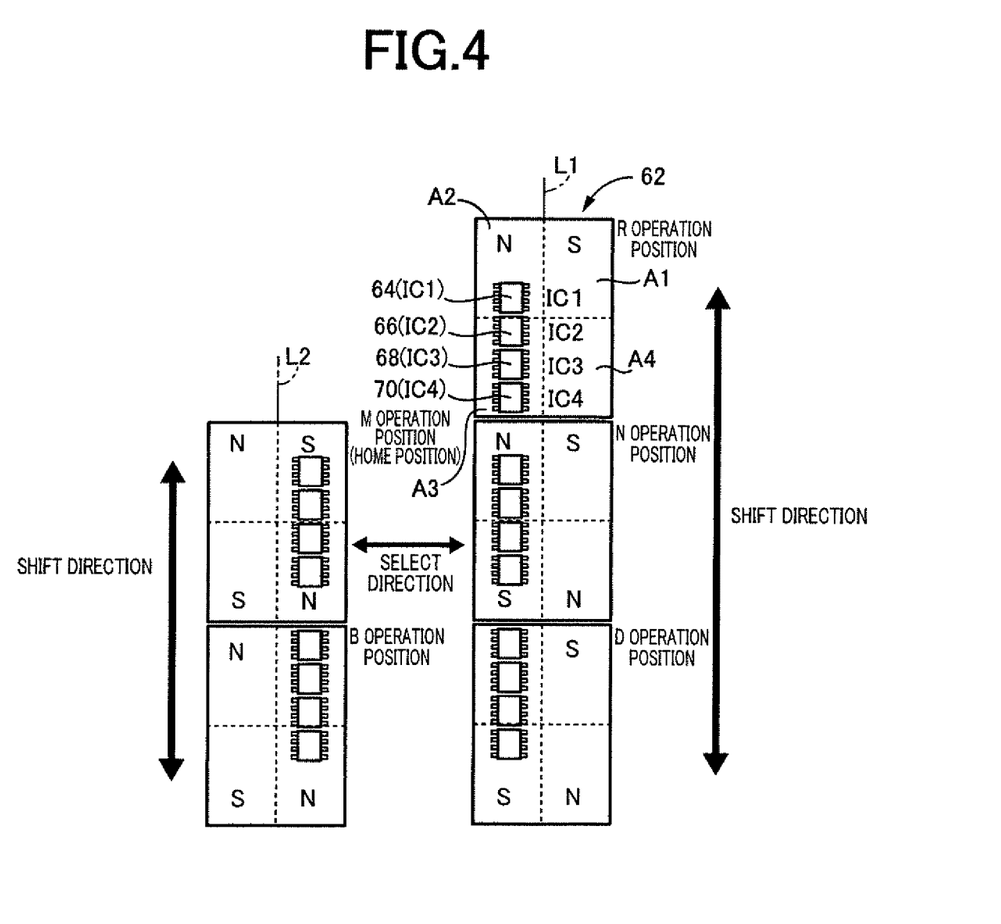
FIG. 4 illustrates a basic hardware configuration of a shift position detecting device detecting a shift operation position of the shift lever and operated by the shift operation device of FIG. 3.

FIG. 4 illustrates a basic hardware configuration of a shift position detecting device 60 detecting the shift operation position of the shift lever 32 of the shift operation device 30 in FIG. 3. The shift position detecting device 60 includes a magnet 62 fixedly disposed at a lower end of the shift lever 32 and integrally moved with the shift lever 32 according to the operation of the shift lever 32 and four Hall ICs, i.e., a Hall IC 64 (hereinafter, IC 1), a Hall IC 66 (hereinafter, IC 2), a Hall IC 68 (hereinafter, IC 3), and a Hall IC 70 (hereinafter, IC 4) arranged in an unmovable manner on a substrate not shown so as to face a lower surface of the magnet 62. Actually, the four Hall ICs are disposed below the magnet 62 and are difficult to see. However, the four Hall ICs are shown in FIG. 4 such that the positions of the four Hall ICs relative to the magnet 62 can be understood for convenience.

Further describing the configuration, FIG. 4 shows respective relative positions of the magnet 62 and the Hall ICs when the shift lever 32 is operated to the shift operation positions indicated in FIG. 4. That is, although it seems that the magnet 62 and the Hall ICs are disposed for each of the shift positions in FIG. 4, the shift operation device 30 is actually made up of the single magnet 62 and the four holes ICs, and the magnet 62 is relatively displaced with respect to the four Hall ICs according to the operation of the shift lever 32.

As shown in FIG. 4, the Hall ICs are arranged on a straight line at equal intervals along the shift direction. Therefore, the shift lever 32 is configured to be operated in the shift direction of operation along the direction in which the Hall ICs are arranged and the select direction perpendicular to the shift direction. The magnet 62 integrally disposed on the shift lever 32 has a rectangular shape and is magnetized such that the N poles and the S poles are longitudinally and laterally adjacent to each other and thereby divided into four magnetic regions indicated by dotted lines of FIG. 4. Specifically, assuming that the first straight line L1 side in the select direction is the right side, and the second straight line L2 side in the select direction is the left side, and that the R operation position side in the shift direction is the upper side, and that the B operation position and D operation position sides in the shift direction are the lower side, the upper left side and the lower right side of the magnet 62 are the N poles, while the upper right side and the lower left side of the magnet 62 are the S poles. Hereinafter, it is defined that the upper right side of the magnet 62 is defined as a region A1 (S pole), that the upper left side of the magnet 62 is defined as a region A2 (N pole), that the lower left side of the magnet 62 is defined as a region A3 (S pole), and that the lower right side of the magnet 62 is defined as a region A4 (N pole).

When the shift lever 32 is operated to the respective shift operation positions along the shift gate 36, the relative positional relationship between the magnet 62 and the Hall ICs becomes respective one of those as shown in FIG. 4. For example, when the shift lever 32 is at the M operation position (home position), the region A1 of the magnet 62 faces the IC 1 and the IC 2 while the region A4 faces the IC 3 and the IC 4. When the shift operation of the shift lever 32 is performed from the M operation position to the B operation position, the magnet 62 is relatively moved to the lower side of FIG. 4 with respect to the Hall ICs, so that the region A1 of the magnet 62 faces the ICs 1 to 3 while the region A4 faces the IC 4. When the shift operation and the select operation of the shift lever 32 are performed from the M operation position toward the R operation position, the magnet 62 is relatively moved to the upper right side of FIG. 4 with respect to the Hall ICs, so that the region A2 of the magnet 62 faces the IC 1 while the region A3 faces the ICs 2 to 4. When the select operation of the shift lever 32 is performed from the M operation position toward the N operation position, the magnet 62 is relatively moved to the right side of FIG. 4 with respect to the Hall ICs, so that the region A2 of the magnet 62 faces the IC 1 and the IC 2 while the region A3 faces the IC 3 and the IC 4. When the shift operation and the select operation of the shift lever 32 are performed from the M operation position toward the D operation position, the magnet 62 is relatively moved to the lower right side of FIG. 4 with respect to the Hall ICs, so that region A2 of the magnet 62 faces the ICs 1 to 3 while the region A3 faces the IC 4.

Figure 5:
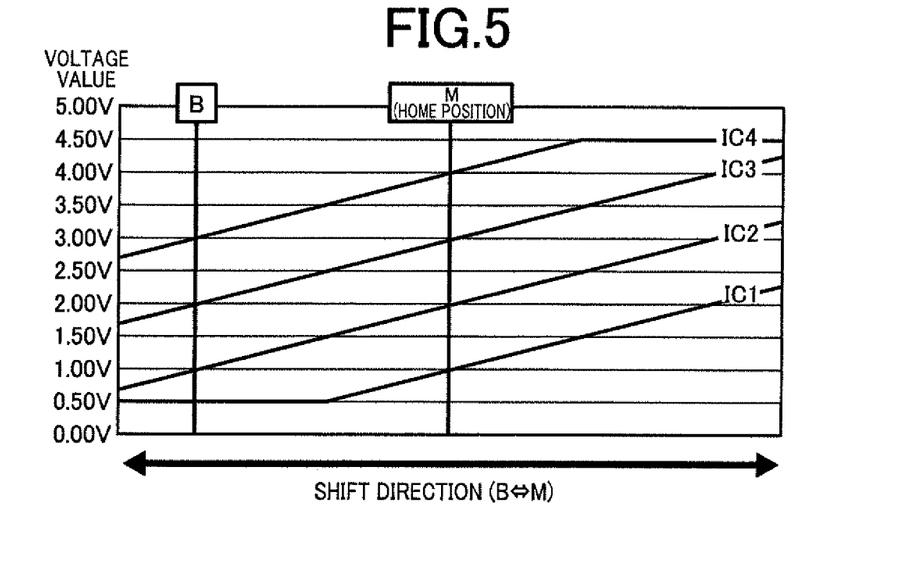
FIG. 5 shows a voltage output from each of sensors when the shift operation of the shift lever is performed between the B operation position and the M operation position in FIG. 4.

FIG. 5 shows a voltage output from each of the Hall ICs when the shift operation of the shift lever 32 is performed between the B operation position and the M operation position in FIG. 4. The electronic control device 20 includes an A/D converter converting an analog voltage output from each of the Hall ICs into a digital signal that can be handled by a computer, and the voltage converted into a digital signal is shown in FIG. 5 and later. In FIG. 5, the horizontal axis indicates a position of the shift lever 32 when the shift lever 32 is moved in the shift direction on the second straight line L2, and the vertical axis indicates a voltage output from each of the Hall ICs.

As shown in FIG. 5, as the shift lever 32 moves from the B operation position toward the M operation position along the second straight line L2, the voltage output from each of the Hall ICs is proportionally increased. Regardless of which position on the second straight line L2 the shift lever 32 is located, the voltage output from the IC 1 is lower than the voltage output from the IC 2, the voltage output from the IC 2 is lower than the voltage output from the IC 3, and the voltage output from the IC 3 is lower than the voltage output from IC 4 (IC 1<IC 2<IC 3<IC 4). In this way, each of the Hall ICs outputs a signal voltage (voltage) corresponding to a relative position (distance) to the magnet 62 and outputs a different voltage for each position of the shift lever 32.

As shown in FIG. 5, when the shift lever 32 is at the M operation position (home position), a voltage of about 1.00 V is output from the IC 1; a voltage of about 2.00 V is output from the IC 2; a voltage of about 3.00 V is output from the IC 3; and a voltage of about 4.00 V is output from the IC 4. When the shift lever 32 is at the B position, a voltage of about 0.5 V is output from the IC 1; a voltage of about 1.00 V is output from the IC 2; a voltage of about 2.00 V is output from the IC 3; and a voltage of about 3.00 V is output from the IC 4.

Figure 6:
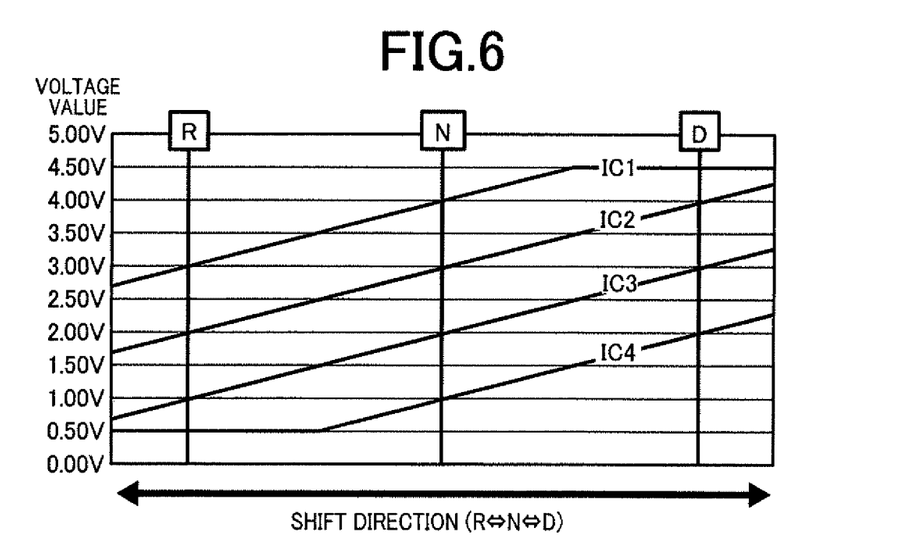
FIG. 6 shows a voltage value output from each of the sensors when the shift operation of the shift lever is performed between the R operation position and the D operation position in FIG. 4.

FIG. 6 shows a voltage value output from each of the Hall ICs when the shift operation of the shift lever 32 is performed between the R operation position and the D operation position in FIG. 4. As shown in FIG. 6, as the shift lever 32 moves from the R operation position toward the D operation position along the first straight line L1, the voltage output from each of the Hall ICs is proportionally increased. Regardless of which position on the first straight line L1 the shift lever 32 is located, the voltage value output from the IC 4 is lower than the voltage value output from the IC 3, the voltage value output from the IC 3 is lower than the voltage value output from the IC 2, and the voltage value output from the IC 2 is lower than the voltage value output from the IC 1 (IC 4<IC 3<IC 2<IC 1). In this way, the Hall ICs output respective different voltage values.

As shown in FIG. 6, when the shift lever 32 is at the R operation position, a voltage of 0.5 V is output from the IC 4; a voltage of about 1.00 V is output from the IC 3; a voltage of about 2.00 V is output from the IC 2; and a voltage of about 3.00 V is output from the IC 1. When the shift lever 32 is at the N operation position, a voltage of about 1.00 V is output from the IC 4; a voltage of about 2.00 V is output from the IC 3; a voltage of about 3.00 V is output from the IC 2; and a voltage of about 4.00 V is output form the IC 1. When the shift lever 32 is at the D operation position, a voltage of about 2.00 V is output from the IC 4; a voltage of about 3.00 V is output from the IC 3; a voltage of about 4.00 V is output from the IC 2; and a voltage of about 4.50 V is output from the IC 1.

The relative relationship (magnitude relationship: IC 4<IC 3<IC 2<IC 1) of the voltage output from the Hall ICs during movement of the shift lever 32 on the first straight line L1 is reversed to the relative relationship (magnitude relationship: IC 1<IC 2<IC 3<IC 4) of the voltage output from the Hall ICs during movement on the second straight line L2 because the polarity of the magnet 62 facing each of the Hall ICs is reversed when the select operation of the shift lever 32 is performed.

Figure 7:
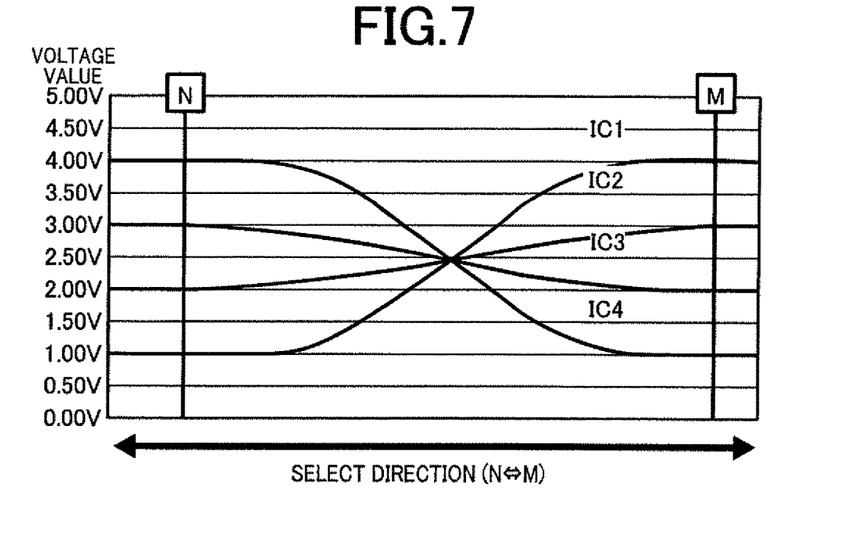
FIG. 7 shows a voltage output from each of the sensors when the shift operation of the shift lever is performed between the M operation position and the N operation position in FIG. 4.

FIG. 7 shows a voltage output from each of the Hall ICs when the shift lever 32 is moved in the select direction between the M operation position and the N operation position. When the shift lever 32 is operated in the select direction, the polarity of the magnet 62 facing the Hall ICs is reversed as can be seen also from FIG. 4, and this reversal of polarity reverses the relative relationship (magnitude relationship) of the output voltage of the Hall ICs.

Returning to FIG. 1, the electronic control device 20 includes, as main portions thereof, the SBW-ECU 100 corresponding to the shift position deciding portion of the present invention surrounded by a dotted line and the HV-ECU 102 corresponding to the drive power output command portion of the present invention surrounded by a broken line.

Figure 8:
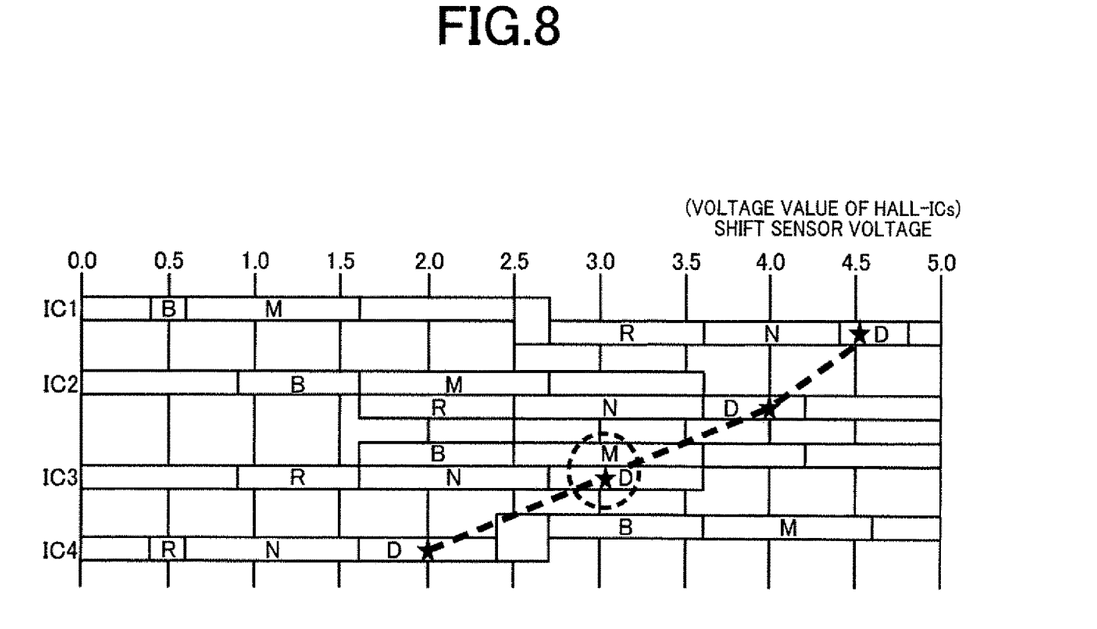
FIG. 8 is a relationship map representing a relationship between the shift operation position and the voltage value shown in FIGS. 4 to 6.

FIG. 8 shows a method in which a shift position determining means 104, which constitutes the SBW-ECU 100 surrounded by the dotted line together with a P-lock determining means 115 in FIG. 1, determines the shift position based on the shift position signal Pss output from the shift position detecting device 60. This is obtained by mapping a correspondence relationship between the voltage value (shift sensor voltage) output from each of the Hall ICs and the shift operation position and corresponds to the relationship between the shift operation position and the voltage value shown in FIGS. 5 to 7. The map of FIG. 8 is set and stored in advance, and the shift operation position of the shift lever 32 is determined from this map based on the voltage value actually output from the Hall ICs. Each of the shift operation positions has a width of the voltage value because of consideration for variations of the voltage value output from the Hall ICs.

Since, for the shift positions of the shift lever 32, different voltages are output from each of the Hall ICs and, for example, when the output of the IC 1 is within a voltage range of about 0.6 V to 1.6 V, it is determined that the shift position is the M position. When the output of the IC 2 is in a voltage range of about 1.6 V to 2.7 V, or when the output of the IC 3 is in a voltage range of about 2.5 V to 3.6 V, or when the output of the IC 4 is in a voltage range of about 3.6 V to 4.6 V, it is determined that the shift position is the M position in each case. Also when the shift operation position is at a position other than the M operation position, i.e., the B, R, N, or D operation position, voltages corresponding to the B, R, N, or D operation position are output from the ICs 1 to 4. Therefore, the shift positions of the B, R, N, and D positions are determined from the voltages output from the ICs 1 to 4.

When a shift position determined based on the voltages output from each respective Hall ICs is consistent with each other, it is determined that the shift lever 32 is operated to the corresponding shift position. It is noted that the IC 2 and the IC 3 have a region corresponding to two shift positions even though the voltage value is the same. For example, the voltage value of 3.0 V of the IC 3 corresponds to either the M position or the D position, so that the shift position is not determined from the IC 3. In such a case, the determination is made based on the shift positions determined based on the other Hall ICs (the ICs 1, 2, 4). For example, when the shift position is determined either the M position or the D position based on the IC 3 and it is determined to be the D position based on all the other Hall ICs (the ICs 1, 2, 4), the shift position is determined as the D position.

Returning to FIG. 1, the electronic control device 20 includes, as main portions thereof, the shift position determining means 104 and the P-lock determining means 115 each corresponding to the SBW-ECU 100, i.e., the shift position deciding portion of the present invention, as well as a communication abnormality determining means 106, a shift range determining means 108, a vehicle speed determining means 110, a shift range control means 112, and a drive power control means 114 each corresponding to the HV-ECU 102, i.e., the drive power output command portion of the present invention.

In FIG. 1, the shift position determining means 104 determines the shift position based on the shift position signal Pss output from the shift position detecting device 60, and outputs the shift position determination signal Psh1 and the shift position determination signal Psh2. The shift range determining means 108 selects a shift range based on the shift position determination signal Psh1 and the shift position determination signal Psh2. When the P switch 34 is operated and the P-switch signal Pon is input to the P-lock determining means 115, the P-lock determining means 115 outputs the P-switching command signal Sp to the parking lock device 50 for performing parking lock (P-lock) of the parking lock device 50 on condition that the vehicle speed V is equal to or less than a vehicle stopping speed threshold value Vb.

The communication abnormality determining means 106 determines that communication is abnormal, for example, when two signals, i.e., the shift position determination signal Psh1 and the shift position determination signal Psh2, transmitted in a predetermined cycle cannot be received for a predefined communication abnormality determination threshold value to (msec). When the communication abnormality determining means 106 determines that communication is abnormal, the shift range determining means 108 determines whether the shift range maintained at the time of occurrence of the communication abnormality is other than a P range (parking range). If the shift range determining means 108 determines that the shift range is the P range, and the shift range control means 112 retains the shift range command signal Psh to the P range. If the shift range determining means 108 determines that the shift range is other than the P range, the vehicle speed determining means 110 determines whether the vehicle speed V is equal to or greater than a predefined vehicle speed threshold value Va (km/h). When the vehicle speed V is lower than the vehicle speed threshold value Va, the shift range determining means 108 determines that the shift range is the N range, and the shift range control means 112 sets the shift range command signal Psh to the neutral range.

The P-lock determining means 115 determines whether the vehicle speed V is equal to or less than the vehicle stopping speed threshold value Vb at which the vehicle can be stopped. If the P-lock determining means 115 determines that the vehicle speed V is equal to or less than the vehicle stopping speed threshold value Vb, the P-lock determining means 115 outputs the P-switching command signal Sp for the P-lock to the parking lock device 50 to actuate the parking lock device 50 when the P switch 34 is operated by the driver and the P-switch signal Pon is input to the P-lock determining means 115. The P-lock determining means 115 retains the shift range command signal Psh to the N range unless the two conditions, i.e., the input of the P-switch signal Pon and the vehicle speed V equal to or less than the vehicle stopping speed threshold value Vb, are not satisfied. If the vehicle speed V is equal to or greater than the vehicle speed threshold value Va, the shift range determining means 108 determines the shift range maintained at the time of occurrence of the communication abnormality as the shift range to be set, and the shift range control means 112 retains the shift range command signal Psh to the shift range maintained at the time of occurrence of the communication abnormality.

If the shift range command signal Psh is the neutral range, the shift range determining means 108 repeats the determination from the communication abnormality. If the shift range command signal Psh is other than the neutral range, the drive power control means 114 provides control such that an acceleration α (m/sec$^2$) of the vehicle becomes equal to or less than a predefined constant acceleration threshold value αa (m/sec$^2$), thereby limiting the drive power. The acceleration α is calculated by differentiation of the output shaft rotation speed Nout with respect to time, etc.

Figure 9:
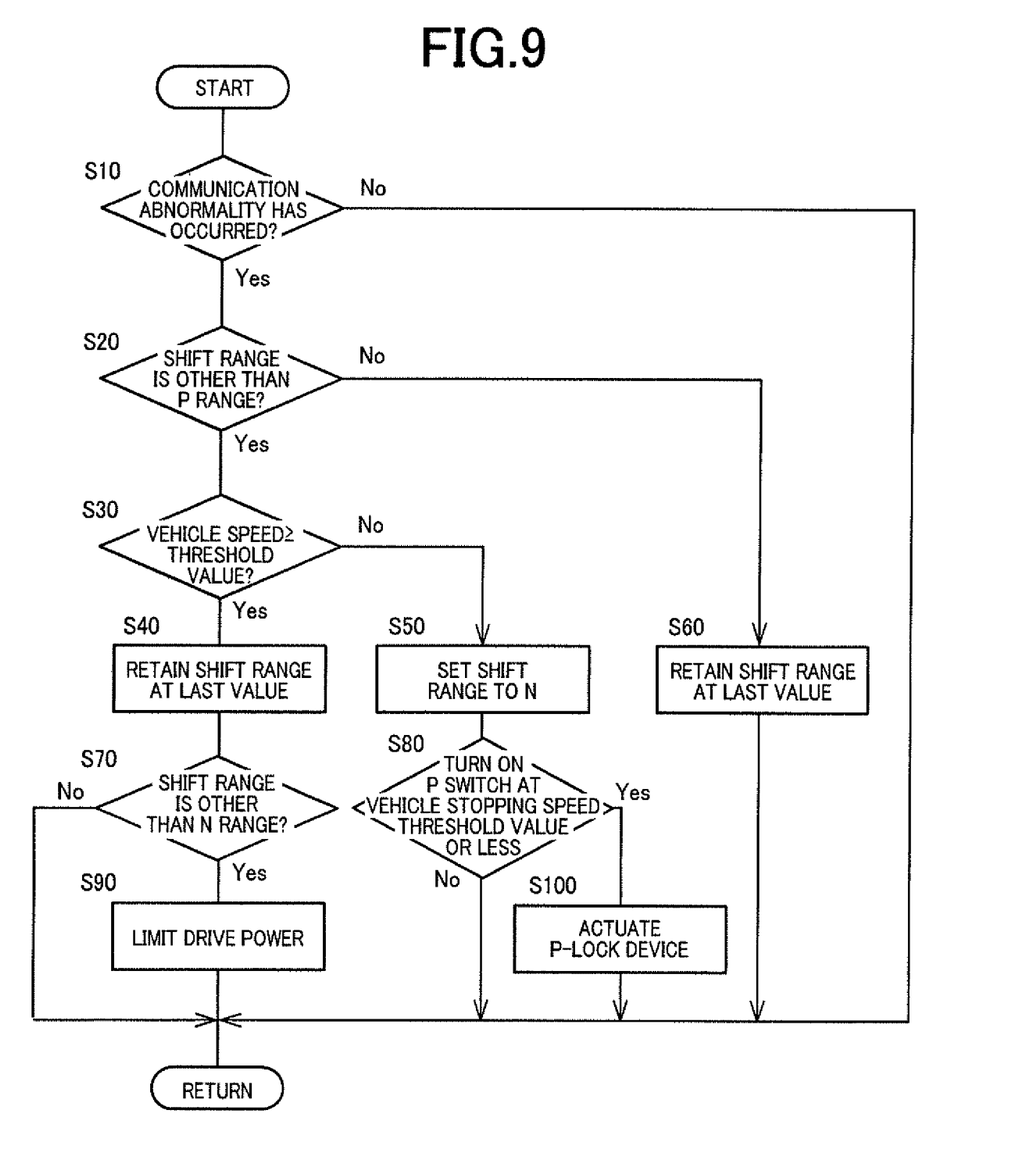
FIG. 9 is a flowchart for explaining a main portion of a control operation of an electronic control device of FIG. 1, i.e., a control operation enabling evacuation running based on a shift range and a vehicle speed at the time of occurrence of a communication abnormality.

FIG. 9 is a flowchart for explaining a main portion of the control operation of the electronic control device 20, i.e., a control operation enabling evacuation running even when it is determined that communication is abnormal because the shift position determination signal Psh1 and the shift position determination signal Psh2 transmitted in a predetermined cycle cannot be received for the communication abnormality determination threshold value ta (msec), for example. This flowchart is repeatedly executed with an extremely short cycle time, for example, several milli-seconds to several tens of milli-seconds.

In FIG. 9, at step S10 (hereinafter, "step" will be omitted) corresponding to the function of the communication abnormality determining means 106, it is determined whether a communication abnormality has occurred, i.e., whether the shift position determination signal Psh1 and the shift position determination signal Psh2 output from the shift position determining means 104 are neither received within a predetermined time defined in advance, i.e., the communication abnormality determination threshold value ta. If the determination of S10 is negative, i.e., if it is determined that no communication abnormality has occurred, the determination from S10 is repeated.

If the determination of S10 is affirmative, i.e., if it is determined that a communication abnormality has occurred, it is determined at S20 corresponding to the function of the shift range determining means 108 whether the shift range maintained at the time of occurrence of the communication abnormality is other than the P range. If the determination of S20 is negative, i.e., if it is determined that the shift range is the P range, the shift range command signal Psh is retained to the P range at S60 corresponding to the functions of the shift range determining means 108 and the shift range control means 112. If the determination of S20 is affirmative, i.e., if it is determined that the shift range is other than the P range, it is determined at S30 corresponding to the function of the vehicle speed determining means 110 whether the vehicle speed V is equal to or greater than the vehicle speed threshold value Va. If the determination of S30 is negative, the shift range command signal Psh is set to neutral range at S50 corresponding to the functions of the shift range determining means 108 and the shift range control means 112.

At S80 corresponding to the function of the P-lock determining means 115, it is determined whether the vehicle speed V is equal to or less than the vehicle stopping speed threshold value Vb at which the vehicle is allowed to be stopped and the P-switch signal Pon from the P switch 34 is input. If this determination is affirmative, at S100 corresponding to the function of the P-lock determining means 115, the P-switching command signal Sp for the P-lock is output to the parking lock device 50 and the parking lock device 50 is actuated for the P-lock.

If it is determined at S30 that the vehicle speed V is equal to or greater than the vehicle speed threshold value Va, at S40 corresponding to the functions of the shift range determining means 108 and the shift range control means 112, the shift range command signal Psh is retained as it is. At S70 corresponding to the function of the shift range determining means 108, it is determined whether the retained shift range command signal Psh is other than the N range. If the determination of S70 is affirmative, the control is provided at S90 corresponding to the function of the drive power control means 114 such that the acceleration α of the vehicle becomes equal to or less than the predetermined acceleration threshold value αa, and the drive power of the vehicle is limited. If it is determined at S70 that the retained shift range command signal Psh is the N range, this routine is repeated.

Figure 10:
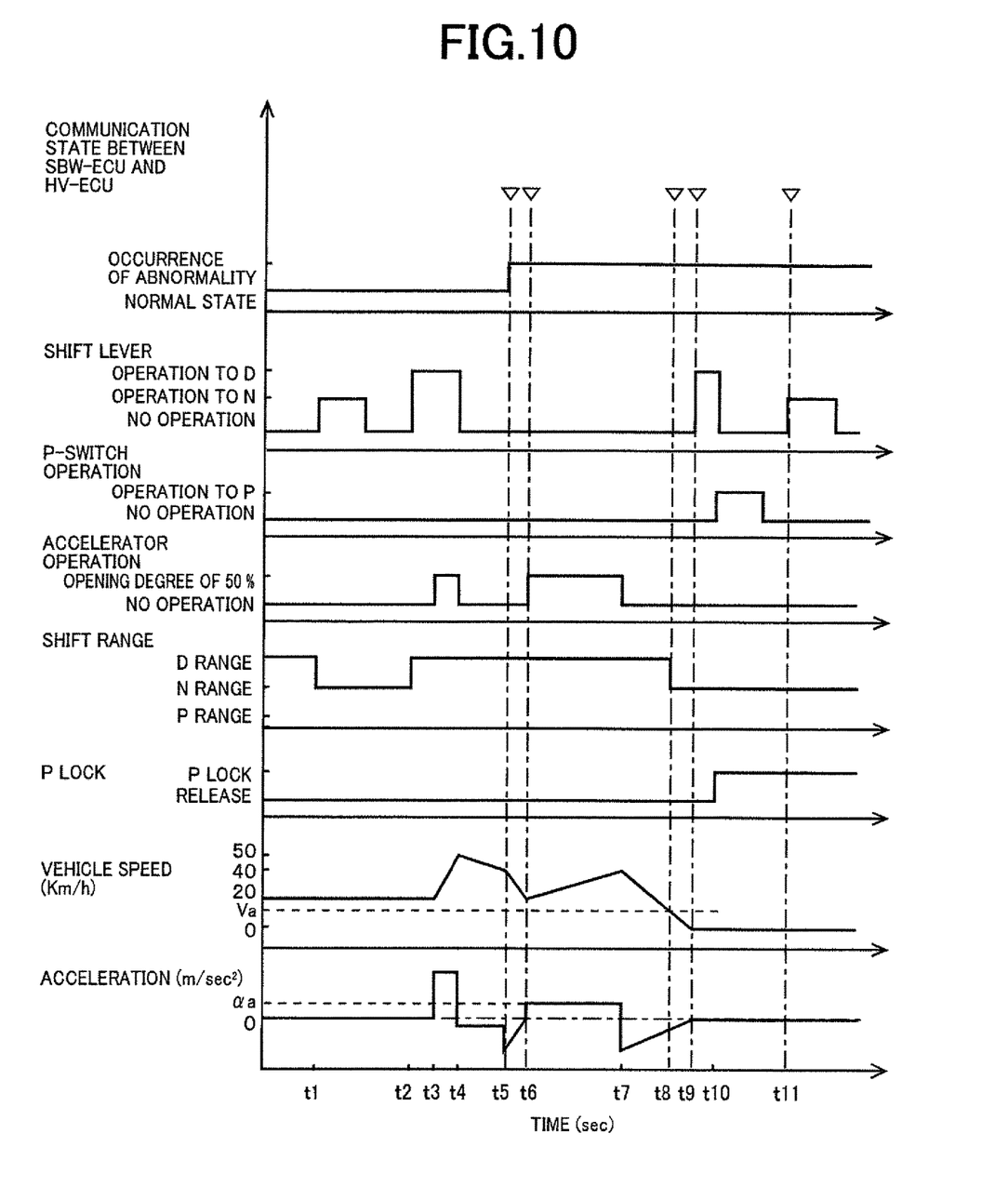
FIG. 10 is a time chart for explaining the control operation shown in the flowchart of FIG. 9.

FIG. 10 shows an example of a time chart when a communication abnormality has occurred between the SBW-ECU 100 and the HV-ECU 102. In this example, the shift operation position is set to the N operation position by an operation of the shift lever at time t1, and the shift operation position is switched from the N operation position to the D operation position by an operation of the shift lever at time t2. At time t3, the accelerator opening degree θacc is set to 50% by an accelerator operation, and the vehicle speed V rises from 20 as the acceleration α increases. At time t4, when the accelerator operation is stopped and the accelerator opening degree θacc becomes substantially zero, both the acceleration α and the vehicle speed V gradually decrease. At time t5, the communication abnormality has occurred, and the shift range is set to the D range at this point. Since the shift range is the D range, it is determined whether the vehicle speed V is equal to or greater than the vehicle speed threshold value Va. Since the vehicle speed V is 40 and therefore equal to or greater than the vehicle speed threshold value Va, the shift range is maintained at the D range and, since the shift range is the D range, the drive power control is provided such that the acceleration α of the vehicle becomes equal to or less than the acceleration threshold value αa. From time t5, no accelerator operation is performed, so that the vehicle speed V decreases.

At time t6, the accelerator opening degree θacc is set to 50% by the operation of the accelerator, so that the acceleration α increases. However, since the drive power control is provided such that the acceleration α of the vehicle becomes equal to or less than the acceleration threshold value αa, the acceleration α is limited to the acceleration threshold value αa and the rise of the vehicle speed V is made gradual. At time t7, when the accelerator operation is stopped again and the accelerator opening degree θacc becomes substantially zero, the vehicle speed V starts to decrease. At time t8, the vehicle speed V falls below the vehicle speed threshold value Va and the shift range is set to the N range. At time t9, although switching to the D operation position is made by an operation of the shift lever 32, the shift range is maintained at the N range. Additionally, the vehicle speed V is equal to or less than the vehicle stopping speed threshold value Vb. The vehicle stopping speed threshold value Vb is set to substantially zero and is not shown in FIG. 10. At time t10, the P switch 34 is operated, and the parking lock device 50 is actuated, i.e., the parking lock is performed, while the shift range is maintained at the N range. At time t11, although the shift lever 32 is operated to the N position, since the shift range is already set to the N range, the N range is maintained and the parking lock is maintained as it is.

According to this example, in the shift control device 10 including the SBW-ECU 100 corresponding to the shift position deciding portion deciding the shift position based on the shift position signal Pss output from the shift position detecting device 60 according to the operation of the shift lever 32 and the HV-ECU 102 corresponding to the drive power output command portion for causing the vehicle to run based on the shift position determination signal Psh1 and the shift position determination signal Psh2 output from the SBW-ECU 100, if a communication abnormality has occurred so that the shift position determination signal Psh1 and the shift position determination signal Psh2 output from the SBW-ECU 100 are not transmitted to the HV-ECU 102, the shift range maintained by the HV-ECU 102 at the time of occurrence of the communication abnormality is selected when the vehicle speed V is equal to or greater than the predetermined vehicle speed threshold value Va defined in advance, and the N range is selected when the vehicle speed V is less than the predetermined vehicle speed threshold value Va defined in advance. Thus, the evacuation running is enabled during the vehicle speed V is maintained to be equal to or larger than the predetermined vehicle speed threshold value Va with the shift range maintained at the time of occurrence of the communication abnormality.

According to this example, if the vehicle speed V is equal to or greater than the predetermined vehicle speed threshold value Va and the shift range maintained at the time of occurrence of the communication abnormality is a running range causing the vehicle to move forward or backward, a drive power limitation is imposed such that the acceleration α of the vehicle is made equal to or less than the acceleration threshold value αa so as to enable suppression to the acceleration α at which the operability of the vehicle can easily be ensured.

According to this example, the vehicle further includes the parking lock device 50 locking the drive wheels not shown and the P switch 34 outputting the operation signal Pon for actuating the parking lock device 50 and, if the vehicle speed V is equal to or less than the predetermined vehicle stopping speed threshold value Vb, the parking lock device 50 is actuated based on the operation signal Pon of the P switch 34, so that the driver can select the parking lock.

According to this example, if the shift range maintained at the time of occurrence of the communication abnormality on the shift position determination signal Psh1 and the shift position determination signal Psh2 is the parking range, the parking range is retained to suppress switching between the shift ranges when the switching is unnecessary.

Another example of the present invention will be described. In the following description, the same portions in common with the example described above are denoted by the same reference numerals and will not be described.

Second Example

Figure 11:
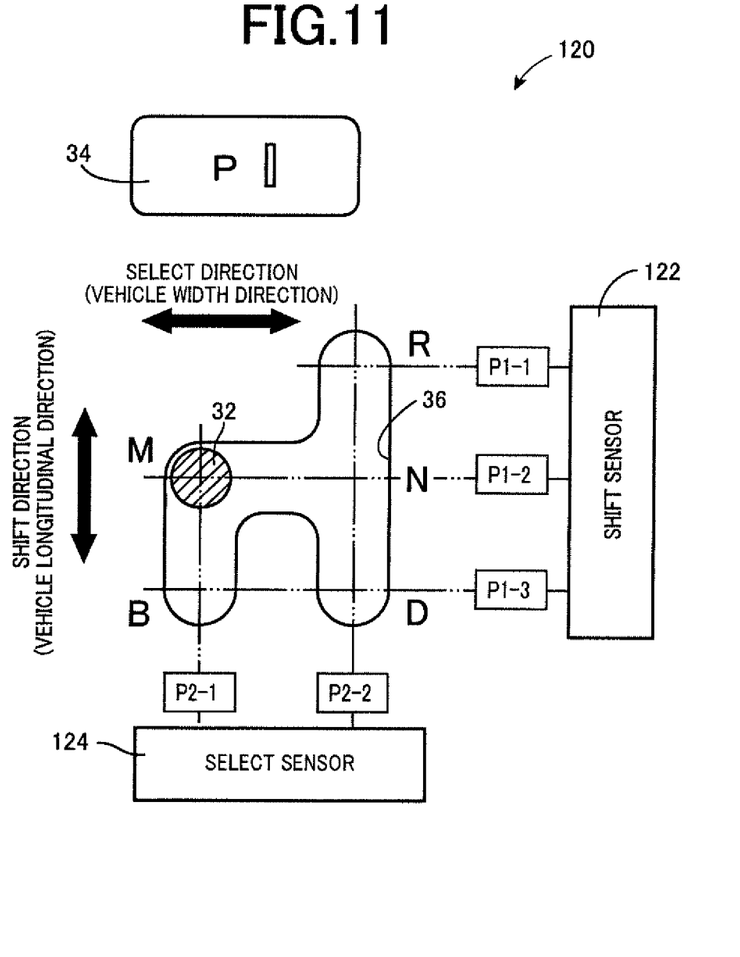
FIG. 11 is a diagram of an example using a shift position detecting device different from the shift position detecting device used in the shift control device of FIG. 1.

FIG. 11 is an example of a shift position detecting device 120 using a method of deciding a shift position different from the first example. In FIG. 11, the shift lever 32 and the P switch 34 similar to the first example are included, and the same operations as the first example are allowed as the operations of the shift lever 32 in the shift direction and the select direction. However, this example is different from the first example in that the shift position detecting device 120 includes a shift sensor 122 and a select sensor 124, that both the shift sensor 122 and the select sensor 124 output a voltage corresponding to the shift position and that the shift position is detected based on the voltage. The positions in the shift direction corresponding to the setting of the respective shift operation positions of the shift lever 32 will hereinafter be referred to as P1-1 for the R position, P1-2 for the M and N positions, and P1-3 for the B and D positions. The positions in the select direction will be referred to as P2-1 for the M and B positions and P2-2 for the R, N, and D positions.

Figure 12:
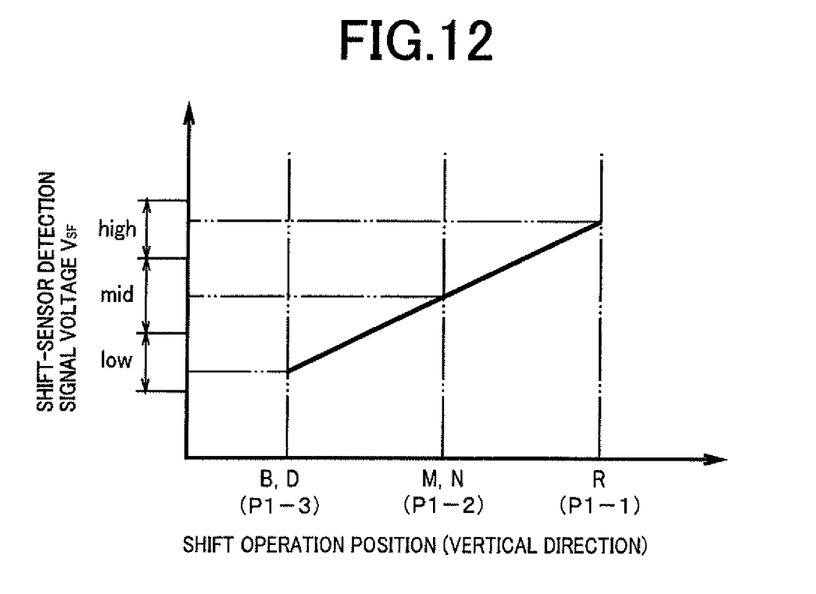
FIG. 12 is a diagram of a relationship between the shift operation position in vertical direction of FIG. 11 and a detection signal voltage of a shift sensor of the shift position detecting device of FIG. 11.
Figure 13:
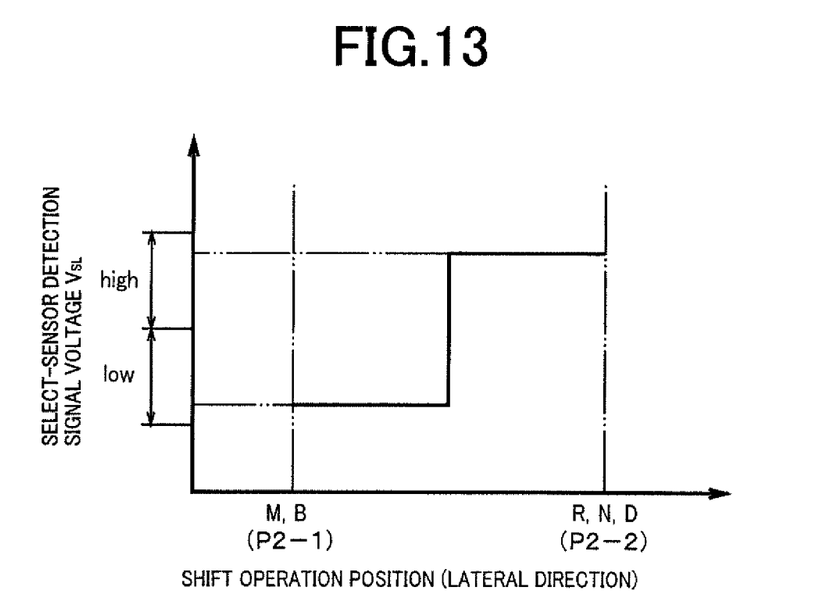
FIG. 13 is a diagram of a relationship between the shift operation position in lateral direction of FIG. 11 and a detection signal voltage of a select sensor of the shift position detecting device of FIG. 11.

FIG. 12 shows detection signal voltages $V_{SF}$ of the shift sensor 122 at the respective shift operation positions of the shift lever 32 detected by the shift position detecting device 120 of FIG. 11. The detection signal voltages $V_{SF}$ of the shift sensor 122 continuously increase from the B and D positions, i.e., P1-3, to the M and N positions, i.e., P1-2, and further continuously increase to the R position, i.e., P1-1. These detection signal voltages $V_{SF}$ are divided into three ranges of high, mid, and low, and it is determined that when the detection signal voltage $V_{SF}$ is in high, mid, and low, the shift position is the R position, the M or N position, and the B or D position, respectively. FIG. 13 shows detection signal voltages $V_{SL}$ of the select sensor 124 at the respective shift operation positions of the shift lever 32 detected by the shift position detecting device 120 of FIG. 11. The detection signal voltages $V_{SL}$ of the select sensor 124 exhibit a stepwise increase from the M and B positions, i.e., P2-1, to the R, N, and D positions, i.e., P2-2. These detection signal voltages $V_{SL}$ are divided into two ranges of high and low, and it is determined that when the detection signal voltage $V_{SL}$ is in high and low, the shift position is the R, N, or D position and the M or B position, respectively.

Figure 14:
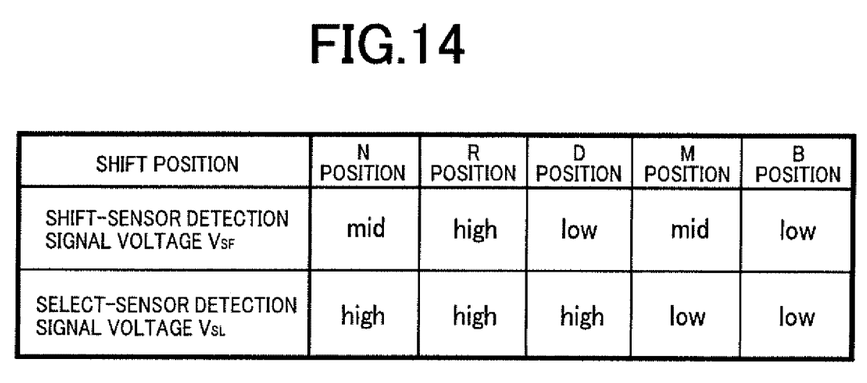
FIG. 14 is a chart of a relationship of the detection signal voltage from the shift sensor of FIG. 11, the detection signal voltage from the select sensor of FIG. 11, and the shift position determined based on these voltages.

FIG. 14 is a chart of a relationship of the detection signal voltage $V_{SF}$ from the shift sensor 122, the detection signal voltage $V_{SF}$ from the select sensor 124, and the shift position determined based on these voltages. The shift position determining means 104, i.e., the SBW-ECU 100, determines the shift position based on a preliminarily stored relationship (map) of the detection signal voltage $V_{SF}$ and the detection signal voltage $V_{SL}$ from the shift position detecting device 120 and the shift position shown in FIG. 14.

For the control operation after occurrence of the communication abnormality, the same control operation as the first example is performed. Therefore, the same effects as the first example are expected in the shift position detecting device 120 of this example. That is, in the shift control device 10, if a communication abnormality has occurred so that the shift position determination signal Psh1 and the shift position determination signal Psh2 output from the SBW-ECU 100 are not transmitted to the HV-ECU 102, the shift range maintained by the HV-ECU 102 at the time of occurrence of the communication abnormality is selected when the vehicle speed V is equal to or greater than the predetermined vehicle speed threshold value Va defined in advance, and the N range is selected when the vehicle speed V is less than the predetermined vehicle speed threshold value Va defined in advance. Thus, the evacuation running is enabled during the vehicle speed V is maintained to be equal to or larger than the predetermined vehicle speed threshold value Va with the shift range maintained at the time of occurrence of the communication abnormality.

According to this example, if the vehicle speed V is equal to or greater than the predetermined vehicle speed threshold value Va and the shift range maintained at the time of occurrence of the communication abnormality is a running range causing the vehicle to move forward or backward, a drive power limitation is imposed such that the acceleration α of the vehicle is made equal to or less than the acceleration threshold value αa so as to enable suppression to the acceleration α at which the operability of the vehicle can easily be ensured.

According to this example, the vehicle further includes the parking lock device 50 locking the drive wheels not shown and the P switch 34 outputting the operation signal Pon for actuating the parking lock device 50 and, if the vehicle speed V is equal to or less than the predetermined vehicle stopping speed threshold value Vb, the parking lock device 50 is actuated based on the operation signal Pon, so that the driver can select the parking lock.

According to this example, when the shift range of the shift position determination signal Psh1 and the shift position determination signal Psh2 maintained at the time of occurrence of the communication abnormality is the parking range, the parking range is retained to suppress switching of the position when the switching is unnecessary.

Although the examples of the present invention have been described in detail with reference to the drawings, the present invention is also applicable to other forms.

Even when a shift position detecting device different from the first and second examples is used, the same control operation as the first and second examples can be performed for the control operation after occurrence of the communication abnormality of the shift position determination signals Psh1, Psh2 output from the SBW-ECU 100 to the HV-ECU 102, and the same effects as the first and second examples are expected.

Although the shift operation device 30 of the examples does not have a manual shift mode, the present invention is not limited thereto, and the shift operation device 30 may include M and S positions for selecting a manual shift mode in which a manual shift control is provided based on a manual operation of the shift lever 32.

The arrangement of the shift positions in the shift operation device 30 of the examples is merely an example and can be changed as needed. Although the shift lever 32 is of momentary type, the shift lever is not necessarily limited to the momentary type.

The above description is merely an embodiment and the present invention can be implemented in variously modified and improved forms based on the knowledge of those skilled in the art.

NOMENCLATURE OF ELEMENTS

10: Vehicle shift control device
32: Shift lever (Shift operator)
34: Parking switch
50: Parking lock device
100: Shift position deciding portion (SBW-ECU)
102: Drive power output command portion (HV-ECU)
Pon: P-switch signal (Operation signal)
Psh1, Psh2: Shift position determination signal
V: Vehicle speed
Va: Vehicle speed threshold value
Vb: Vehicle stopping speed threshold value
α: Acceleration
αa: Acceleration threshold value

What is claimed is:

1. A vehicle shift control device comprising:
   a shift position deciding portion configured to decide a shift position of a shift operating device based on a sensor signal output according to an operation of the shift operating device; and
   a drive power output command portion configured to select a shift range based on a shift position determination signal output from the shift position deciding portion to cause a vehicle to run, wherein
   when a communication abnormality has occurred so that the shift position determination signal is not transmitted from the shift position deciding portion to the drive power output command portion,
   the vehicle shift control device selects, when a vehicle speed is equal to or greater than a predetermined value, a shift range maintained at a time of occurrence of the communication abnormality of the shift position determination signal, and
   the vehicle shift control device selects, when the vehicle speed is less than the predetermined value, a neutral range.

2. The vehicle shift control device according to claim 1, wherein when the vehicle speed is equal to or greater than the predetermined value and the shift range maintained at the time of occurrence of the communication abnormality of the shift position determination signal is a running range for moving the vehicle forward or backward, a drive power limitation is imposed to make an acceleration of the vehicle equal to or less than a predetermined acceleration value.

3. The vehicle shift control device according to claim 2, wherein
   the vehicle further includes a parking lock device configured to lock drive wheels of the vehicle and a parking switch configured to output an operation signal for actuating the parking lock device, and wherein
   when the vehicle speed is equal to or less than a predetermined vehicle stopping speed threshold value, the parking lock device is actuated based on the operation signal.

4. The vehicle shift control device according to claim 3, wherein
   when the shift range maintained at the time of occurrence of the communication abnormality of the shift position determination signal is a parking range, the parking range is retained.

5. The vehicle shift control device according to claim 2, wherein
   when the shift range maintained at the time of occurrence of the communication abnormality of the shift position determination signal is a parking range, the parking range is retained.

6. The vehicle shift control device according to claim 1, wherein
   the vehicle further includes a parking lock device configured to lock drive wheels of the vehicle and a parking switch configured to output an operation signal for actuating the parking lock device, and wherein
   when the vehicle speed is equal to or less than a predetermined vehicle stopping speed threshold value, the parking lock device is actuated based on the operation signal.

7. The vehicle shift control device according to claim 6, wherein
   when the shift range maintained at the time of occurrence of the communication abnormality of the shift position determination signal is a parking range, the parking range is retained.

8. The vehicle shift control device according to claim 1, wherein
   when the shift range maintained at the time of occurrence of the communication abnormality of the shift position determination signal is a parking range, the parking range is retained.

* * * * *